Nov. 7, 1967 A. B. WELCH 3,350,776

METHOD OF MAKING AN ELECTRICAL CONNECTION

Filed Aug. 2, 1965

ALBERT B. WELCH
INVENTOR
BY Robert M. Sperry
ATTORNEY

United States Patent Office 3,350,776

Patented Nov. 7, 1967

3,350,776
METHOD OF MAKING AN ELECTRICAL CONNECTION

Albert B. Welch, Dallas, Tex., assignor to LTV Aerospace Corporation, Dallas, Tex., a corporation of Delaware Filed Aug. 2, 1965, Ser. No. 476,604
3 Claims. (Cl. 29—592)

This invention relates to electrical connections and is particularly directed to novel methods and apparatus for making electrical connections.

In electronic computers and the like, it has often been proposed heretofore to make electrical connections by means of coherers. Following the teachings of the prior art, coherers have generally comprised a quantity of powdered metal or the like contained between and in contact with two or more electrodes. By applying a predetermined voltage across a selected pair of the electrodes of such a device, the powder can be "welded" to provide an electrically conductive path between the selected electrodes. However, the coherers of the prior art have been subject to numerous disadvantages. For example, the quality of the "welds" obtained by prior art techniques has been poor. Consequently, the establishment of conductive paths by this technique has been unreliable. Moreover, the slightest jar has often been sufficient to break the weld. Thus, circuits employing such devices have had virtually no mechanical shock resistance. Furthermore, where attempts have been made to complete a plurality of circuits through a single coherer, short circuits have been a severe problem. In addition, the coherers of the prior art have been "one-shot" devices. That is, once a conductive path has been established from one electrode to a second electrode, it is not possible, with prior art coherers, to destroy this path and establish a new path from said one electrode to a third electrode.

These disadvantages of prior art coherers are overcome with the present invention and novel methods and apparatus for making electrical connections are provided which permit positive and reliable welding of the particles forming a conductive path bewteen selected electrodes. Moreover, with the technique of the present invention, the shock resistance of the conductive path is greatly improved while the possibility of short circuiting is substantially reduced. Furthermore, the technique of the present invention makes it possible to destroy an undesired conductive path and to reconnect the electrodes in new paths. In addition, the present invention permits a plurality of independent conductive paths to be connected to a common electrode.

The advantages of the present invention are preferably attained by replacing the powdered metal with a mixture of thermosetting plastic and a powder formed of a paramagnetic, electrically conductive material. With this arrangement, a magnetic field can be provided between selected electrodes, prior to application of the welding charge to align the particles of the powder and provide a stronger and more reliable weld. Moreover, the heat developed by the welding charge serves to form a solid, insulating sheath about the conductive path which reduces the possibility of short circuiting between adjacent paths and which is sufficiently resilient to withstand relatively strong mechanical shocks. Furthermore, by providing electrodes which are large compared to the size of particles of the conductive material, it is found that a plurality of conductive paths can be established between a common electrode and other selected electrodes. In addition, it is found that by applying a relatively strong electrical charge across an undesired path, the conductivity of the path can be destroyed. Consequently, the circuit can be revised as often as desired without replacing the connecting device.

Accordingly, it is an object of the present invention to provide improved methods and apparatus for making electrical connections.

Another object of the present invention is to provide methods and apparatus for improving the mechanical shock resistance of coherers.

An additional object of the present invention is to provide methods and apparatus for forming insulated conductive paths between the electrodes of coherers.

A further object of the present invention is to provide methods and apparatus which permit destruction of an established conductive path between the electrodes of a coherer and establishment of an alternative conductive path.

A specific object of the present invention is to provide a device for making electrical connections comprising a plurality of spaced electrodes; and mixture of a thermosetting plastic and a quantity of powdered, paramagnetic, electrically conductive material located between and in engagement with said electrodes.

Another specific object of the present invention is to provide a method of making electrical connections, said method comprising the steps of applying a magnetic field between selected electrodes of a coherer, and applying a predetermined charge of electricity across said selected electrodes.

An additional specific object of the present invention is to provide a method of destroying an electrically conductive path established between two electrodes of a coherer, said method comprising the step of applying a relatively large electrical charge across said two electrodes.

These and other objects and features of the present invention will be apparent from the following detailed description taken with reference to the figures of the accompanying drawing.

Figures 1, 2, 3:
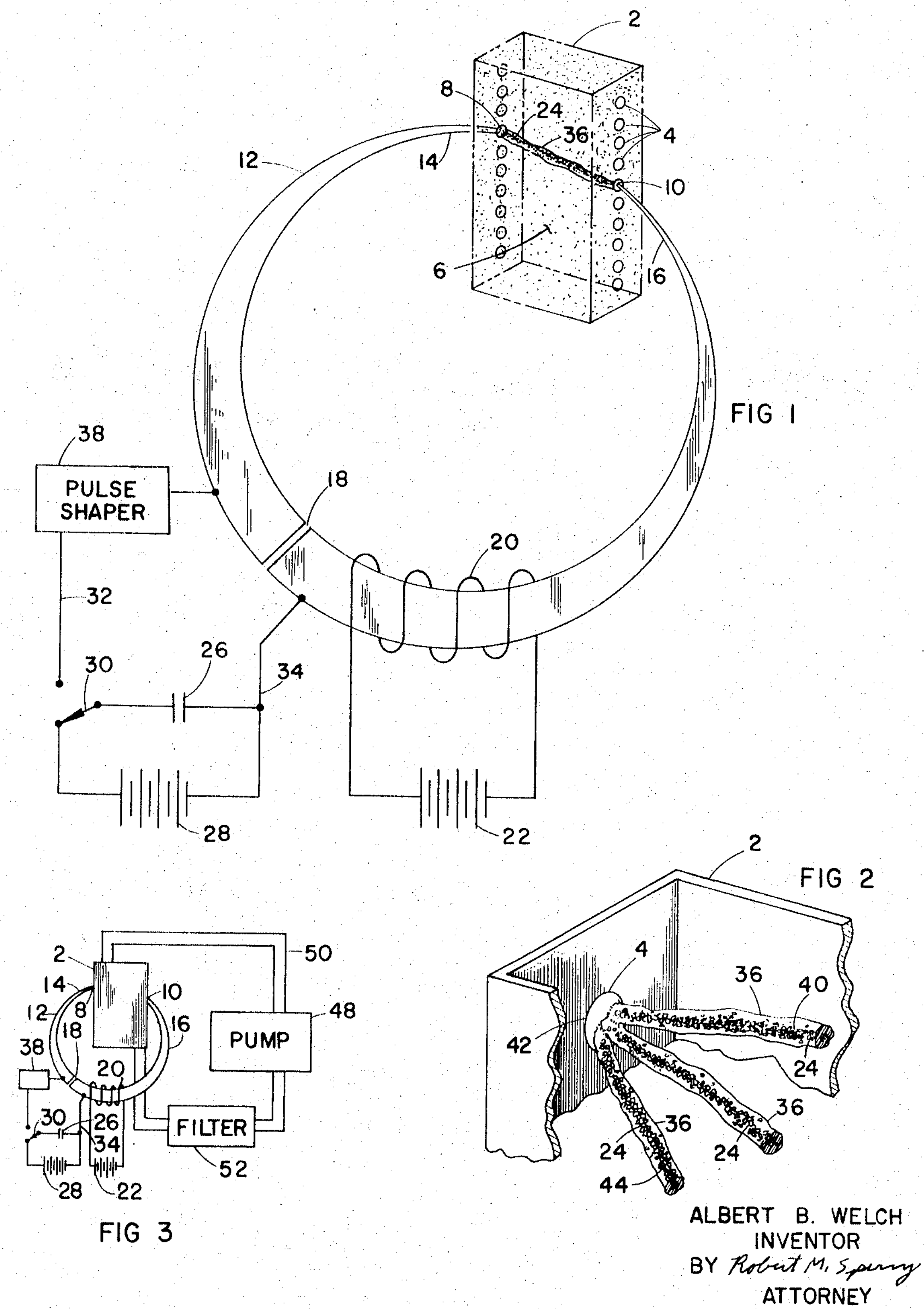
FIGURE 1 is a diagrammatic representation of apparatus for making electrical connections embodying the present invention.
FIGURE 2 is an enlarged view of a detail of the apparatus of FIGURE 1.
FIGURE 3 is a diagrammatic representation of an alternative form of the apparatus of FIGURE 1.

In that form of the present invention chosen for illustration in FIGURE 1, a hollow container 2 is provided, formed of non-magnetic, non-conductive material and having a plurality of electrodes 4 mounted thereon communicating between the interior and exterior surfaces of the container 2. The container 2 is filled with a mixture 6 of a thermosetting electrically insulating material with a quantity of electrically conductive, paramagnetic, powdered material which extends between and engages the surfaces of the electrodes 4 within the container 2.

To establish an electrical connection between any two selected electrodes, such as electrodes 8 and 10, a probe 12 is provided, formed of a material of low magnetic reluctance and having two ends, indicated at 14 and 16, which are insulated from each other by an air gap, as seen at 18, or other suitable means. By placing the ends 14 and 16 of the probe 12 on the selected electrodes 8 and 10, as shown in FIG. 1, a magnetic field may be established in the probe 12, as by solenoid 20 and battery 22, which passes through the container 2, between the selected electrodes 8 and 10, causing the paramagnetic particles in the mixture 6 to align themselves to form a "chain" between the electrodes 8 and 10, as seen at 24. Subsequently, a predetermined quantity of electric charge may be passed from electrode 8, through the "chain" 24, to electrode 10 to weld the particles of "chain" 24 together to form an electrically conductive path connecting electrodes 8 and 10. For example, a capacitor 26 may be charged by a battery 28 to provide a predetermined charge. Thereafter, capacitor 26 may be discharged through switch 30, lead 32, end 14 of probe 12, electrode 8, "chain" 24, electrode 10, end 16 of probe 12, and lead 34 to weld the particles of "chain" 24. Simultaneously, the heat generated during the welding serves to set the thermosetting plastic to form an insulating sheath about the chain 24, as indicated at 36.

This procedure may be repeated as often as desired to establish substantially any number of insulated, conductive paths between selected pairs of electrodes. Since each conductive path is encased in its own insulating sheath, the problem of short circuiting between adjacent conductice paths is eliminated. Moreover, the insulating sheaths have considerable resilience. Consequently even if the device is subjected to mechanical shocks which would be sufficient to break the chains, the sheaths will tend to retain the components of the chains in contact with each other so that the conductive path will not be destroyed. Thus, the mechanical shock resistance of the device of the present invention is far superior to the devices of the prior art.

It will be understood that the longer the magnetic field is applied prior to the application of the welding charge, the more particles of the paramagnetic material will become aligned to form the chain 24. Consequently, the resistance of the conductive paths can be controlled by regulating the length of time that the magnetic field is applied before the welding charge. Moreover, the thickness of the insulating sheath can be controlled by regulating the length of time that an electric current of sufficient magnitude to cause heating is passed through the chain 24. If desired, a pluse shaping circuit, as indicated at 38, may be included in the charging circuit to supply shaped electrical pulses having a peak, to weld the chain, and a tail, to set the plastic.

In some instances, it may be desirable to connect several conductive paths to a single electrode, for example, to establish parallel circuits. To permit this, the surface area of the electrodes 4 is preferably made large compared to the expected cross-sectional area of the chains 24, as shown in FIG. 2. With this arrangement, a first conductive path 40 is established between the common electrode 42 and a first other electrode (not shown), in the manner described with respect to FIG. 1. Thereafter, a second conductive path 44 may be established between common electrode 42 and a second other electrode, not shown, in the same manner. This process may be repeated until all the desired connections have been made.

It may also be desired to revise the circuits through the connection device of the present invention. Thus, it may be desired to disconnect one electrode from a second electrode and to re-connect one or both of these electrodes to other electrodes. Furthermore, it may be desirable to accomplish such revision without disturbing other existing connections through the device. In accordance with the method of the present invention, this may be accomplished by applying a relatively large electrical charge across a conductive path which is to be disconnected to "burn out" the chain, in a manner similar to that which occurs when a fuse is overloaded. The new circuit may then be established as described above. This technique may be repeated as often as desired and, since no mechanical operations are involved, circuitry may be provided to initiate such revision either manually or by remote control.

It will be seen that when a conductive path is destroyed, in the manner described above, the insulating sheath will remain substantially intact. Ordinarily, this will present no problem. However, where frequent circuit revision is required, it may be desirable as shown in FIG. 3, to provide a reservoir 46 of the mixture of thermosetting plastic with the paramagnetic powder and to circulate the mixture through the container 2, by means of pumps 48 and conduits 50 or the like. When this is done, the flow rate of the mixture may be made such that an insulating sheath, from which the chain has been burned out, will be carried out of the container 2 and can be removed by a suitable filter 52 to prevent sheaths and conductors which are no longer in use from accumulating in the container to possibly interfere with the establishment of subsequent connections.

Obviously, numerous variations and modifications may be made without departing from the present invention. Accordingly, it should be clearly understood that the forms of the invention described above and shown in the figures of the accompanying drawing are illustrative only and are not intended to limit the scope of the present invention.

What is claimed is:

1. The method of making electrical connections through a coherer containing powdered, paramagnetic, electrically conductive material; said method comprising the steps of:
applying a magnetic field across said coherer between a selected pair of electrodes to cause particles of said material to become aligned between said electrodes; and subsequently applying an electrical charge across said coherer between said electrodes to weld said aligned particles into an electrically conductive path joining said electrodes.

2. The method of making electrical connections through a coherer containing a mixture of thermosetting, electrically insulating material and powdered paramagnetic, electrically conductive material; said method comprising the steps of:
applying a magnetic field across said coherer between a selected pair of electrodes to cause particles of said material to become aligned between said electrodes; and
subsequently applying an electrical charge across said coherer between said electrodes to weld said aligned particles into an electrically conductive path joining said electrodes and to cause setting of said thermosetting material to form an electrically insulating sheath about said conductive path.

3. The method of making electrical connections through a coherer containing a mixture of thermosetting, electrically insulating material and powdered, electrically conductive material; said method comprising the steps of:
developing an electrical charge,
shaping said charge to provide a peak portion and a tail portion; and
applying said charge across said coherer between a selected pair of electrodes to cause said peak portion to weld the particles of said material into an electrically conductive path joining said electrodes and to cause said tail portion to effect setting of said thermosetting material to form an electrically insulating sheath about said conductive path.

References Cited

UNITED STATES PATENTS

| | | | |
|---|---|---|---|
| 908,504 | 1/1909 | Sargent | 338—1 |
| 2,472,214 | 6/1949 | Hurvitz | 338—114 |
| 2,660,640 | 11/1953 | Wolf | 329—100 X |
| 2,899,657 | 8/1959 | Quade et al. | 338—1 |
| 2,939,113 | 5/1960 | Roth | 329—100 X |
| 2,951,817 | 9/1960 | Myers. | |

JOHN F. CAMPBELL, *Primary Examiner.*
J. CLINE, *Assistant Examiner.*